Patented July 31, 1934

1,968,601

UNITED STATES PATENT OFFICE 1,968,601

PREPARATION OF OLEFINE DERIVATIVES

Karl Edlund, Berkeley, and Theodore Evans, Oakland, Calif., assignors to Shell Development Company, San Francisco, Calif., a corporation of Delaware No Drawing. Application February 14, 1934, Serial No. 711,218

25 Claims. (Cl. 260—151)

This invention relates to the segregation and utilization of olefine hydrocarbons and to the production of their derivatives including mixed ethers and other useful substances. The olefines to be treated may be obtained from any suitable source, for instance, from natural gas as by cracking, or from gases or products which are formed in distilling or cracking petroleum or petroleum products, or may be derived from peat, coal, oil shales and like carboniferous natural materials. Also, the olefines may be obtained from the products which are formed by the destructive hydrogenation of carbonaceous materials such as coal, brown coal, tar, coal tar, petroleum and petroleum products, and other carbonaceous materials which are suitable for treatment by destructive hydrogenation.

We have discovered that tertiary-base olefines (olefines capable of forming tertiary alcohols by hydration) can be selectively absorbed from their mixtures with other olefines by catalytic treatment with an alcohol, preferably with a primary or secondary alcohol.

The olefine mixtures obtained from the materials heretofore mentioned are exceedingly complex and it is therefore desirable to subject these mixtures to fractionation by condensation, distillation, or both, whereby hydrocarbons containing the same number of carbon atoms to the molecule are segregated into one fraction. We prefer to practice our process with hydrocarbon fractions containing four or more carbon atoms to the molecule although our invention is not restricted thereto, as the olefines to be treated may be in a pure or substantially pure state or mixed with other compounds whether or not of inert character.

For purposes of illustration only, we shall refer to the treatment of hydrocarbon fractions whereby tertiary-base olefines are catalytically converted to mixed ethers and selectively removed from the hydrocarbon fraction.

The preferred hydrocarbon material, either in the gaseous or liquid state, is treated with an alcohol in the presence of a catalyst under suitable conditions. Primary alcohols as methyl, ethyl and normal propyl alcohols, etc., are effective as are secondary alcohols as isopropyl alcohol, etc. The net reaction is as follows:

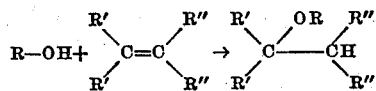

wherein R' represent any alkyl residues which may or may not be identical, R" represent any alkyl residues which may or may not be identical or H and ROH represents any primary or secondary alcohol of aliphatic or aromatic character. The process is quite flexible with respect to the catalyst, which may be of acidic or non-acidic character, depending on operating conditions. Where resort is had to an acid catalyst, sulfuric acid, the sulfonic acids of benzene and its homologues may be used as well as other acid catalysts. Metallic chlorides are one type of available non-acidic catalysts and we have found that aluminum chloride is very favorable to our process.

When resort is had to an acid catalyst, we prefer to operate with sulfuric acid, preferably of between 75% to 100% strength, as a decrease in the strength of acid employed involves an increase in the amount of water present; the latter exerting an unfavorable influence upon the equilibrium of the reaction by tending to convert the tertiary-base olefines as well as the ethers formed to alcohols. Thus in certain instances it may be desirable to operate with the concentrated sulfuric acid of commerce of from 90% to 100% strength.

The reaction is unusually elastic in the sense that any desired proportion of agent may be employed. Thus when the object is the substantially complete removal of tertiary-base olefines from a mixture of fluid hydrocarbons, it is desirable to employ an excess of the alcohol; on the other hand, if the substantially complete conversion of an alcohol to a mixed ether is desired, an excess of the tertiary-base olefines is advisable. The order of introduction of the agents into one another may be varied, as the alcohol and catalyst may be added to the olefine and vice versa, or the alcohol and olefine to the catalyst and vice versa. Care must be taken when adding an acid catalyst with the olefine to the alcohol that low temperatures are maintained during the addition of the acid catalyst to the olefine and vice versa, as otherwise the reaction may be violent and lead to the formation of an undesirable product. The proportion of alcohol to acid may be varied greatly; from about 100% to 30% or less of alcohol may be employed with from about a trace to 70% or more of $H_2SO_4$ of 100% strength, the exact proportion depending ultimately on the character of the tertiary-base olefine being treated and on the character of the alcohol employed, it being realized that an increase of alcohol in acid solution increases the permissible temperature at which the mixed ethers may be formed without involving a substantial similar attack upon the secondary-base olefines (olefines capable of forming secondary alcohol by hydration)

which might be present. Conversely, an increase of the acid concentration in the alcohol solution decreases the permissible temperature at which the mixed ethers may be formed without involving a substantial similar attack upon the secondary-base olefines which might be present. Too high a temperature affects the equilibrium unfavorably and we have ascertained that with pure tertiary-base olefines it is desirable to work with temperatures below 95° C., the exact operating temperature depending on the character, strength and concentration of the catalyst as well as the character and concentration of the alcohol and of the tertiary-base olefine. However, when operating with tertiary-base olefines diluted with other hydrocarbons or inert fluids, it is often desirable to work at higher temperatures despite the less favorable equilibrium existing therein. Thus when using a pure tertiary-base olefine, the ether when formed dissolves in the alcohol-catalyst solution and facilitates further dissolving and reaction of the remaining olefine so that the equilibrium concentration of ether is reached fairly rapidly. On the other hand, when a diluted tertiary-base olefine is employed the reaction is naturally less rapid and hence it is sometimes desirable to heat to a higher temperature than with pure tertiary-base olefines since the increase in reaction rate compensates to a certain extent for the lessened yield at a higher temperature. This lessened yield in turn may be prevented by the use of a larger excess of one of the reactants.

The following specific examples are presented for illustrative purposes only:

Example I 400 c. c. isopropyl alcohol, 20 c. c. concentrated commercial sulfuric acid and 164 gm. isobutylene are heated with stirring at 75° C. for 4 hours. 111 gm. of isopropyl tertiary butyl ether are obtained.

Example II 400 c. c. methyl alcohol, 20 c. c. concentrated commercial sulfuric acid and 145 gm. isobutylene are heated to 75° C. for 1 hour. 186 gm. methyl tertiary butyl ether are obtained.

Example III 400 c. c. of a solution of 600 c. c. methyl alcohol to 150 c. c. concentrated commercial sulfuric acid and 153 gm. of a commercial butane-butene fraction containing approximately 16% isobutylene are contacted in the liquid state a 60° C. for 1½ hours. 20 gm. methyl tertiary butyl ether are recovered.

Example IV

Working in the gaseous phase, solutions of 150 and 200 c. c. concentrated commercial sulfuric acid to 600 c. c. methyl alcohol are treated with gas mixtures of isobutylene and inert gas in which the isobutylene content varies from 7% to 100%. At 50° C., the scrubbed, outgoing gas has an olefine content which reaches zero at low gas velocities; the removed olefine is recovered from the alcohol-acid solution in the form of the mixed ether substantially quantitatively.

Example V 66 gm. of trimethyl ethylene, 80 gm. of $CH_3OH$ and 9 gm. of 96% $H_2SO_4$ were heated 3 hours at 75° C. The recovered ether represented 61% conversion of the olefine to ether.

When working with mixtures of tertiary-base olefines, secondary-base olefines and other hydrocarbons, the resulting mixed ethers can be effectively removed from the reaction mixture, as by distillation. It may be necessary with a high acid concentration to reduce the acidity of the reaction mixture before distillation in order to prevent the decomposition of the ether. In certain instances, when stratification occurs, it may be desirable to work up the two layers separately. For example, the upper layer consisting essentially of ether and hydrocarbons can be removed and distilled without further treatment; the lower layer containing ether, alcohol and acid then being distilled after suitable adjustment of the acidity to give an azeotropic mixture of alcohol and ether from which the ether can be recovered by methods available to those skilled in the art. On the other hand, the azeotropic mixture can be utilized as such for solvation purposes. If desired, the lower layer may be treated with fresh alcohol and allowed to react again with more hydrocarbon, the process being repeated. It is also advantageous to add alcohol during the reaction so as to maintain a fairly constant alcohol: acid ratio in the lower layer throughout the reaction.

The mixed ethers so obtained are very suitable as solvents.

The process can be suitably adjusted so as to be executed in a continuous manner as well as intermittently or batch. One suitable method is as follows:

A tower is fitted at the bottom with a fine jet, so that liquid may be sprayed into it. The tower is then filled with alcohol-acid in the desired proportions, and a mixture of hydrocarbon and alcohol introduced through the jet. The hydrocarbon material is finely divided and rises slowly through the acid solution. As it rises, the tertiary-base olefines are etherified. At the top, the drops coalesce to a hydrocarbon layer containing the ether and a little alcohol which separates. It is withdrawn, washed to remove traces of acid and the alcohol, and distilled to recover the ether. The ratio of entering hydrocarbon to alcohol is adjusted so as to keep the composition of the acid solution in the tower relatively constant; nothing is withdrawn at the bottom of the tower.

If desired, paddles and the like may also be inserted in the tower to promote mixing.

We believe that our advantageous results are achieved by maintaining at all times in the tower a high proportion of acid phase to hydrocarbon phase. The reaction or mixing tower or chamber is followed by a settling chamber from which the ether-hydrocarbon layer could be removed for distillation and the acid layer returned to the mixing chamber, together with fresh reactants.

The following example is cited merely to illustrate the specific adaptation of the above:

Example VI

A tower 20 feet long and 1 inch in diameter was fitted with a jet of 0.010 inches in diameter. The column which was heated to 50° C. was filled with a mixture of methyl alcohol and sulfuric acid (3 volumes alcohol to one volume acid).

A mixture of 100 volumes of an amylene-pentane hydrocarbon fraction analyzing about 25% tertiary-base olefine to 5 volumes methyl alcohol was introduced through the jet at the rate of about one gallon per hour. The entire system was kept under 50 pounds pressure to prevent volatilization of the hydrocarbon fraction. The material leaving the top of the tower under these circumstances contained around 15% ether by weight; passing this material through a second time increased the ether content to about 18%, while a third treatment produced no further effect, showing that two passes establish equilibrium under the above conditions.

Our mixed ethers are ethers possessing two organic residues attached to an oxygen atom, one of which organic residues being of aliphatic character and being bound to the oxygen atom by a carbon atom which in turn is linked to three other carbon atoms.

This application is a continuation-in-part of our application, Serial No. 547,784 filed June 29, 1931.

We claim as our invention:

1. The process for the preparation of mixed ethers from a tertiary-base olefine and an alcohol, comprising reacting the olefine and an alcohol in the presence of a condensing agent which promotes a condensing action between a tertiary olefine and an alcohol at a temperature below 95° C.

2. The process for the preparation of mixed ethers from a tertiary-base olefine and an alcohol, comprising reacting the olefine and an alcohol in the presence of a non-acidic condensing agent which promotes a condensing action between a tertiary olefine and an alcohol.

3. The process for the preparation of mixed ethers from a tertiary-base olefine and an alcohol, comprising reacting the olefine and an alcohol in the presence of an acid condensing agent which promotes a condensing action between a tertiary olefine and an alcohol at a temperature below 95° C.

4. The process for the preparation of mixed ethers from a tertiary-base olefine and an alcohol, comprising reacting the olefine and an alcohol in the presence of sulfuric acid at a temperature below 95° C.

5. The process for the preparation of a mixed ether from isobutylene and an alcohol, comprising reacting isobutylene and an alcohol in the presence of a condensing agent which promotes a condensing action between a tertiary olefine and an alcohol.

6. The process for the preparation of a mixed ether from isobutylene and an alcohol, comprising reacting isobutylene and an alcohol in the presence of a condensing agent which promotes a condensing action between a tertiary olefine and an alcohol, at a temperature below 95° C.

7. The process for the preparation of a mixed ether from isobutylene and an alcohol, comprising reacting isobutylene and an alcohol in the presence of a non-acidic condensing agent which promotes a condensing action between a tertiary olefine and an alcohol.

8. The process for the preparation of a mixed ether from isobutylene and an alcohol, comprising reacting isobutylene and an alcohol in the presence of an acid condensing agent which promotes a condensing action between a tertiary olefine and an alcohol.

9. The process for the preparation of a mixed ether from isobutylene and an alcohol, comprising reacting isobutylene and an alcohol in the presence of an acid condensing agent which promotes a condensing action between a tertiary olefine and an alcohol at a temperature below 95° C.

10. The process for the preparation of a mixed ether from isobutylene and an alcohol, comprising reacting isobutylene and an alcohol in the presence of sulfuric acid.

11. The process for the preparation of a mixed ether from isobutylene and an alcohol, comprising reacting isobutylene and an alcohol in the presence of sulfuric acid at a temperature below 95° C.

12. A process for the preparation of tertiary mixed ethers from a hydrocarbon mixture containing tertiary-base olefines, comprising treatment of such a mixture with an alcohol in the presence of a condensing agent which promotes a condensing action between a tertiary olefine and an alcohol.

13. A process for the selective absorption and removal of tertiary-base olefines from their admixture with secondary-base olefines, comprising treating the mixture with an alcohol at a temperature below that at which the secondary-base olefines are substantially attacked, in the presence of a condensing agent which promotes a condensing action between a tertiary olefine and an alcohol, and removing the mixed ethers formed.

14. A process for the selective absorption and removal of tertiary-base olefines from their admixture with secondary-base olefines, comprising treating the mixture with an alcohol at a temperature below that at which the secondary-base olefines are substantially attacked, in the presence of a non-acidic condensing agent which promotes a condensing action between a tertiary olefine and an alcohol, and removing the mixed ethers formed.

15. A process for the selective absorption and removal of tertiary-base olefines from their admixture with secondary-base olefines, comprising treating the mixture with an alcohol at a temperature below that at which the secondary-base olefines are substantially attacked, in the presence of an acid condensing agent which promotes a condensing action between a tertiary olefine and an alcohol, and removing the mixed ethers formed.

16. A process for the selective absorption and removal of tertiary-base olefines from their admixture with secondary-base olefines, comprising treating the mixture with an alcohol at a temperature below that at which the secondary-base olefines are substantially attacked, in the presence of sulfuric acid, and removing the mixed ethers formed.

17. A process for the selective absorption and removal of isobutylene from its admixture with butylenes, comprising treating the mixture with an alcohol at a temperature below that at which the secondary butylenes are substantially attacked, in the presence of a condensing agent which promotes a condensing action between a tertiary olefine and an alcohol, and removing the tertiary-butyl mixed ether formed.

18. A process for the selective absorption and removal of isobutylene from its admixture with butylenes, comprising treating the mixture with an alcohol at a temperature below that at which the secondary butylenes are substantially attacked, in the presence of a non-acidic condensing agent which promotes a condensing action between a tertiary olefine and an alcohol, and removing the tertiary butyl mixed ether formed.

19. A process for the selective absorption and removal of isobutylene from its admixture with butylenes, comprising treating the mixture with an alcohol at a temperature below that at which the secondary butylenes are substantially attacked, in the presence of an acid condensing agent which promotes a condensing action between a tertiary olefine and an alcohol, and removing the tertiary butyl mixed ether formed.

20. A process for the selective absorption and removal of isobutylene from its admixture with butylenes, comprising treating the mixture with an alcohol at a temperature below that at which the secondary butylenes are substantially attacked, in the presence of sulfuric acid, and removing the tertiary butyl mixed ether formed.

21. A process for the selective absorption and removal of tertiary-base olefines from a mixture of hydrocarbons and essentially containing olefines possessing more than three carbon atoms to the molecule, comprising treating the mixture with an alcohol at a temperature below that at which the secondary-base olefines present are substantially attacked, in the presence of a condensing agent which promotes a condensing action between a tertiary olefine and an alcohol, and removing the mixed ethers formed.

22. A process for the selective absorption and removal of tertiary-base olefines from a mixture of hydrocarbons and essentially containing olefines possessing more than three carbon atoms to the molecule, comprising treating the mixture with an alcohol at a temperature below that at which the secondary-base olefines present are substantially attacked, in the presence of a non-acidic condensing agent which promotes a condensing action between a tertiary olefine and an alcohol, and removing the mixed ethers formed.

23. A process for the selective absorption and removal of tertiary-base olefines from a mixture of hydrocarbons and essentially containing olefines possessing more than three carbon atoms to the molecule, comprising treating the mixture with an alcohol at a temperature below that at which the secondary-base olefines present are substantially attacked, in the presence of an acid condensing agent which promotes a condensing action between a tertiary olefine and an alcohol, and removing the mixed ethers formed.

24. A process for the selective absorption and removal of tertiary-base olefines from a mixture of hydrocarbons and essentially containing olefines possessing more than three carbon atoms to the molecule, comprising treating the mixture with an alcohol at a temperature below that at which the secondary-base olefines present are substantially attacked, in the presence of sulfuric acid, and removing the mixed ethers formed.

25. A process for the preparation of mixed tertiary ethers from a mixture of tertiary-base and secondary-base olefines, comprising reacting the tertiary-base olefinic content with an organic compound containing a carbinol group in the presence of an acid which promotes a condensing action between a tertiary olefine and a hydroxylated organic body and whose concentration is below that essential for the substantial reaction of said hydroxy compound with secondary olefines at the operating temperature.

THEODORE EVANS.
KARL EDLUND.